United States Patent

Roussakov

Patent Number: 6,092,174
Date of Patent: Jul. 18, 2000

[54] DYNAMICALLY RECONFIGURABLE DISTRIBUTED INTEGRATED CIRCUIT PROCESSOR AND METHOD

[75] Inventor: Vladimir P. Roussakov, St. Petersburg, Russian Federation

[73] Assignee: Context, Inc., Tavares, Fla.

[21] Appl. No.: 09/088,165

[22] Filed: Jun. 1, 1998

[51] Int. Cl.[7] .................................................. G06F 15/00
[52] U.S. Cl. .............................. 712/15; 712/11; 712/16; 712/23
[58] Field of Search ........................ 712/37, 23, 11, 712/15, 16

[56] References Cited

U.S. PATENT DOCUMENTS

| | | | |
|---|---|---|---|
| 4,851,995 | 7/1989 | Hsu et al. ................................. | 364/200 |
| 5,020,059 | 5/1991 | Gorin et al. ............................. | 371/11.3 |
| 5,361,367 | 11/1994 | Fijany et al. ............................. | 395/800 |
| 5,457,410 | 10/1995 | Ting ........................................ | 326/41 |
| 5,535,406 | 7/1996 | Kolchinsky ............................. | 395/800 |
| 5,535,408 | 7/1996 | Hillis ....................................... | 395/800 |
| 5,590,284 | 12/1996 | Crosetto ............................. | 395/200.05 |
| 5,600,845 | 2/1997 | Gilson .................................... | 395/800 |
| 5,649,106 | 7/1997 | Tsujimichi et al. ................. | 395/200.08 |
| 5,649,179 | 7/1997 | Steenstra et al. ....................... | 395/598 |
| 5,689,661 | 11/1997 | Hayashi et al. ......................... | 395/311 |
| 5,892,962 | 4/1999 | Cloutier ................................... | 712/16 |

Primary Examiner—Meng-Ai T. An
Assistant Examiner—Mackly Monestime
Attorney, Agent, or Firm—Edward M. Livingston, Esq.

[57] ABSTRACT

A dynamically reconfigurable distributed integrated circuit processor has at least one two-layer matrix in which a first layer has operative microcomputer modules (1) with local memory (2) grouped in computational clusters (5) and a second layer has a network of global communications connecting buses (7, 8) with packet decoders in coherence with the first layer. All components of the basic operating units are micro programmable and in universal communication selectively throughout separate operative microcomputer modules and throughout the computational clusters. Electrical conductivity of components is variable for select speed, timing and factors. A use method is described.

14 Claims, 7 Drawing Sheets

DYNAMICALLY RECONFIGURABLE DISTRIBUTED INTEGRATED CIRCUIT PROCESSOR AND METHOD

BACKGROUND OF THE INVENTION

This invention relates to computer processors and in particular to distributed integrated circuit signal processors that are dynamically reconfigurable.

A current direction of development in computer technology is towards dynamically in-use reconfiguration in lieu of down-time reprogramming and software redirection of processors for computing. Known developments of configurable and dynamically reconfigurable computing to date fundamentally employ computer architecture such as field-programmable gate arrays (FPGA) of conventional logic gates in combination with conventionally programmable computers. There are no known computer processors having an integrated circuit of basic operating modules of computers in communication with an integrated circuit of communications buses in a manner taught by this invention.

An example of present reconfigurable computing is FPGAs that contain memory and arithmetic processing units but that are limited to use with special-purpose blocks of circuitry has been under development recently at Massachusetts Institute of Technology by Andre DeHon and Thomas F. Knight Jr. Another example is a dynamic instruction set computer (DISC) in which a conventional microprocessor has been combined with an FPGA by Brad L. Hutchings at Brigham Young University.

Additional examples of different but related developments in reconfigurable computing are described in the following patent documents. U.S. Pat. No. 5,600,845, issued to Gilson on Feb. 4, 1997, is limited to use with a "personal computer" as a "host" for "programming means defining an appropriate mode of operation of a gate array" (FPGA) as stated in its independent claims. The programming means are employed also to program input/output (I/O) blocks, logic blocks of conventional gates and routing resources. The Gilson patent describes a reprogrammable coprocessor, not a processor architecture which can function independently of an auxiliary computer as taught by this invention. In addition, the Gilson patent is limited to a core with a reduced instruction set computer (RISC) in a slave relationship to a master host processor instead of equal processor elements being contained in a central processing unit as taught by this invention. Dependance of the Gilson device on programming by a host computer may aid its versatility in comparison to some reconfigurable FPGAs but confines it to software limitations which are eliminated by this invention.

U.S. Pat. No. 5,535,406, issued to Kolchinsky on Jul. 9, 1996, describes and illustrates a Netlist type of computer with a processor module containing FPGA employing conventional gates that it recommends as a "virtual processor module" for variable hardware functions. Independent claims 1 and 8 in the Kolchinsky patent list components with widely inclusive features not having architectural or working relationship to each other.

Neither describing nor illustrating computer architecture or working relationships of features other than a Netlist type of computer and FPGA with conventional gates for a "virtual" processor module, the Kolchinsky patent is limited to those features in the context in which they are described. It does not include a more broadly inclusive "reconfigurable, programmable logic matrix array" nor more broadly inclusive "programmable processing elements" than it describes or otherwise teaches. Claims 2 and 9 of the Kolchinsky patent specify that the "programmable logic matrix array comprises a plurality of programmable processing elements" but with description of FPGA of primarily a Netlist type of computer. Further, in light of extensive technical discussion of FPGA and Netlist related components with complexity of programming a core of low-level elements that the Kolchinsky patent did describe, other architecture and features in relationship to "programmable processing elements" would have been described and discussed also if they had been anticipated for the Kolchinsky patent.

The Kolchinsky patent did not describe the distributed, dynamically reconfigurable signal processor with a two-layered array of clustered basic operational modules as taught by this invention. Instead of FPGAs, the present invention describes architecture of a functionally complete processor based on a central processing unit having a core to which all computational resources are accessible for high specific computing density with a high degree of reconfigurability for a wide selection of classes of applications. Instead of conventional OR or AND gates employed in field programmable gate arrays, functionally intelligent modules with ALU capability and/or memory registers are distributed with integrated circuitry for a central-processing functional unit structure that makes application of algorithms much easier and more transparent for a user with this invention.

An additional difference from the FPGA "virtual" process of the Kolchinsky patent relates to time for reprogramming and switching functions which are critical to most applications of reconfigurable computing. FPGA is a relatively fine-meshed logic structure. Although some forms of FPGA are finer than others, all require immensely more time than a distributed "chunky" system employed by this invention to accomplish computational functions.

Further yet, this invention allows dynamic reprogramming of the core during operation. This is not possible with the Kolchinsky virtual processor or with other known reconfigurable processors.

U.S. Pat. No. 5,689,661, issued to Hayashi, et al. on Nov. 18, 1997, describes switching technology for a reconfigurable network of processors.

U.S. Pat. No. 5,361,367, issued to Fijany, et al. on Nov. 1, 1994, describes robotic computation that specifically requires a host computer that is not required by this invention.

U.S. Pat. No. 5,020,059, issued to Gorin, et al. on May 28, 1991, describes switching technology for processor elements which are obviated by the central processing unit of this invention.

U.S. Pat. No. 4,748,585, issued to Chiarulli, et al. on May 31, 1988, describes partitioning of arithmetic logic units (ALU) that also is obviated by this invention.

A known alternative to reconfigurability for enhanced adjustment of computer capability is parallel processing, such as described in U.S. Pat. No. 5,535,408, issued to Hillis on Jul. 9, 1996. Instead of adaptive reconfiguring as taught by this invention, it provides oversupply of computer capability with a high plurality of separate integrated circuit chips that can be accessed quickly with parallel communication for algorithmic adaptability. It is too different for novelty comparison.

SUMMARY OF THE INVENTION

Objects of patentable novelty and utility taught by this invention are to provide a dynamically reconfigurable distributed integrated circuit processor and method which:

Can be reconfigured independently of external programming software, hardware and firmware;

Reconfigures itself to optimize performance during computer operations;

Is so much faster, adaptive and reliable than present computer processors that it opens up wholly new technological and human-factor vistas of development; and Is much smaller, more convenient to use and easier to program for wide selections of uses and for widely variable uses at low cost.

This invention accomplishes these and other objectives with a dynamically reconfigurable distributed integrated circuit processor having two layers in which a first layer has a plurality of operative microcomputer modules (OMM) of reconfigurable microcomputers grouped in computer clusters and a second layer has a network of global communications connecting buses with packet decoders in network nodes in coherence with the first layer. Each of the operative microcomputer modules have at least three inputs for n-bit active operands, one instruction input, two n-bit active operand outputs, one n-bit operand result output, and one instruction output.

Contained by each of the operative microcomputer modules are a basic logic element and a micro-controller.

Each basic logic element in the operative microcomputer modules has at least two basic n-bit active operand registers, one basic n-bit result register, a multi-functional controllable combination logic unit with an instruction-assigned operating function, and a set of transfer buses for internal data and instruction.

Each n-bit register in each basic logic element has a select plurality of memory cells and means for routing input and output data streams.

The packet decoders in the nodes of the global communications connecting bus network have one control microinstruction address input and a plurality of outputs equal to a plurality of operative microcomputer modules in a computational cluster.

The basic operative microcomputer modules are connected to two sets of local communications buses. A first set of buses connects (a) active operand inputs and outputs, (b) result operand outputs of each operative microcomputer module to active operand inputs and outputs, and (c) resultant operand outputs of basic operating computer models of pluralities of computational clusters to corresponding global communications buses of additional computational clusters. A second set of buses connects (a) control microinstruction inputs and outputs of each operative microcomputer module to control microinstruction inputs, and (b) outputs of the operative microcomputer modules of each computational cluster to corresponding global communications buses of additional computational clusters.

The entire process or is an integrated microcircuit having a structure composed of homogeneous elements.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

DESCRIPTION OF PREFERRED EMBODIMENT

Terms used to describe features of this invention are listed below with numbering in the order of their initial use with reference to the drawings. These terms and numbers assigned to them designate the same features wherever used throughout this description.

1. Operative microcomputer module
2. Local memory
3. Local communication buses
4. Operator element
5. Computer clusters
6. Register file
7. Horizontal pathway buses
8. Vertical pathway buses
9. Pathway batch controllers
10. Injector
11. Pathway segment bus
12. Input/output port
13. Base logic element
14. Core microprogrammer
15. User microprogrammer
16. Operative memory
17. Core command multiplexer
18. User command multiplexer
19. Core memory block
20. User memory block
21. Core sequencer
22. User sequencer
23. N-bit active operand registers
24. N-bit result register
25. Combination-logic block
26. Command register
27. First transfer buffer register
28. Second transfer buffer register
29. First output stacking register
30. Second output stacking register
31. First preliminary stacking register
32. Second preliminary stacking register
33. Module-data buffer
34. Cluster multiplexer
35. First commutator
36. Second commutator
37. Third commutator
38. Pathway microprogrammer
39. Memory matrix
40. Local decoder
41. Eligible microprocessor
42. First vector
43. Second vector
44. Third vector
45. Horizontal frame
46. Vertical frame
47. Routing table
48. Fifo
49. Frame grabber
50. First link vector
51. Second link vector
52. Third link vector
53. Fourth link vector
54. Fifth link vector
55. Sixth link vector
56. Seventh link vector
57. Eight link vector
58. Ninth link vector
59. Tenth link vector
60. Eleventh link vector
61. Twelfth link vector Referring first to FIG. 1, a dynamically reconfigurable distributed integrated circuit processor is two-layered with a first layer having a plurality of operative microcomputer modules (OMMs) 1 and local memory 2 linked together by a network of local communication buses 3 and having an operator element 4. A second layer is a network of global communication buses in global and local communication with pluralities of the operative microcomputer modules 1 in computer clusters 5.

Distribution of the dynamically reconfigurable distributed integrated circuit processor is preferably a planar or spacial "spread-out" to facilitate integrated circuit construction. Also included can be "chunky" distribution that need not be totally planar and still permit homogeneous integrated circuit architecture.

Figure 1:
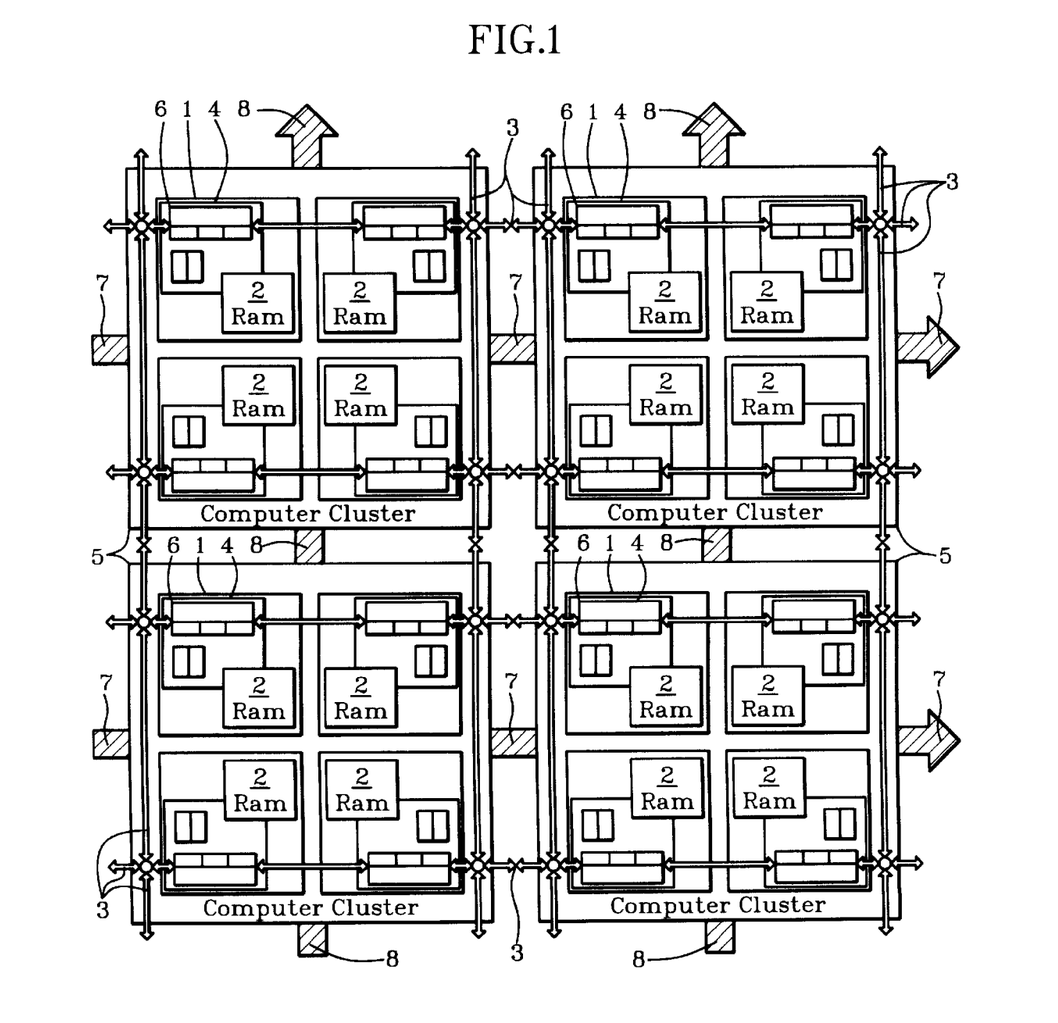
FIG. 1 is a schematic diagram of an integrated circuit having a plurality of distributed operative microcomputer modules with local communications network and global communications.

The local memory 2 and a register file 6 in the operator element 4 provide input-output interface during connections and interaction of pluralities of operative microcomputer modules 1. The input-output interface is a commutable parallel-serial port having three outputs of n-bit active operands. Two of the outputs are data-transfer outputs and one is a result output for output of an operand which forms in a particular operative microcomputer module 1 during execution of a functional operation assigned to the particular operative microcomputer module 1. Each of the operative microcomputer modules 1 also has one input and one output for external commands.

All operative microcomputer modules 1 are inter-communicative with each adjacent module through the local communication buses 3 which are a local communications network.

In a preferred embodiment, the local communications network is in connection with operative microcomputer modules 1 that are contiguous and/or positioned in two orthogonal directions. In this embodiment, groups of operative microcomputer modules 1 are formed in a matrix of four operative microcomputer modules 1 as depicted in FIG. 1. Each such group is a computer cluster 5 which is referred to also as a computer-processor cluster. In addition to serial communication, each of the operative microcomputer modules 1 retains capability of parallel communication, through its register file 6, with corresponding register files 6 of other adjacent operative microcomputer modules 1. This assures functional organization of local inter-cluster communications.

In a preferred variant of the above embodiment, the matrix has sixteen operative microcomputer modules. However, the matrix can be constructed to contain a significantly larger plurality than shown in FIG. 1. Pluralities of matrices can be joined and connected in a manner similar to joining and connecting pluralities of clusters in a single matrix.

Figure 2:
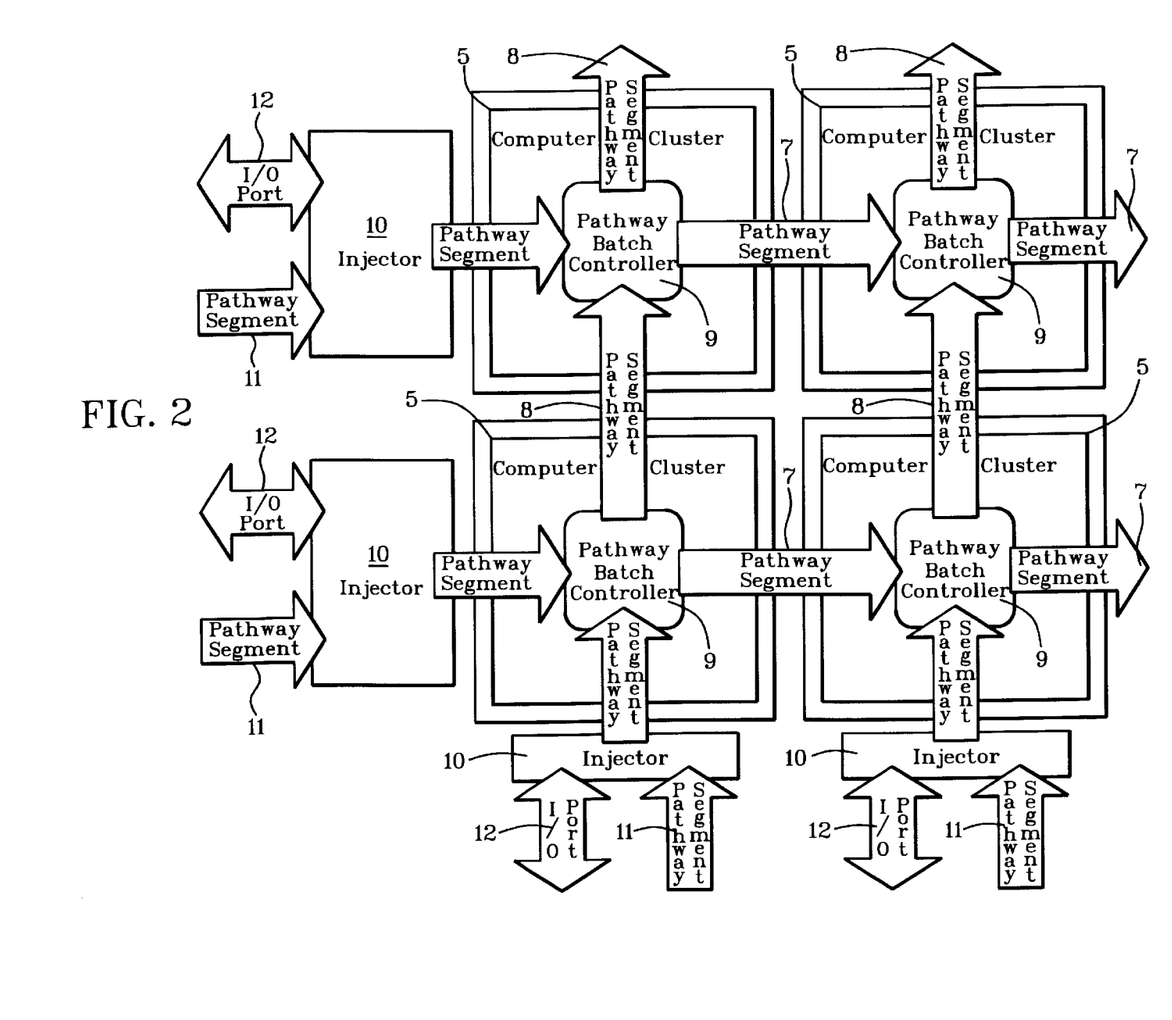
FIG. 2 is a schematic diagram of main global communications buses of an operative microcomputer module having input-output injectors.

The second layer of the dynamically reconfigurable distributed integrated circuit processor, which is a network of global communications buses, has a plurality of orthogonally connecting pathways buses. For reference convenience, the orthogonally connecting pathway buses are designated horizontal pathway buses 7 and vertical pathway buses 8 which are structured in pathway segments as depicted in FIG. 2. Positioning of the horizontal pathway buses 7 and the vertical pathway buses 8 is generally planar in a plane that is generally parallel to a plane of rows and columns of operative microcomputer modules 1. The horizontal pathway buses 7 and vertical pathway buses 8 of the global communications buses are a global communications network of the dynamically reconfigurable distributed integrated circuit processor.

Referring to FIG. 2, the horizontal pathway buses 7 and the vertical pathway buses 8 have nodes with pathway batch controllers 9 at orthogonal intersections that coincide with geometric centers or computer clusters 5. Pathway segments of the horizontal pathway buses 7 and pathway segments of the vertical pathway buses 8 which are nearest to edges of the operative microcomputer modules 1 have injectors 10 through which two-way communication is transmitted internally between processor components and externally to and from external devices. For dynamically reconfigurable distributed integrated circuit processors having a plurality of matrices of operative microcomputer modules 1, the injectors 10 have two external connecting buses. One is a pathway segment bus 11 which provides communication for each of the matrices through the horizontal pathway buses 7. The other is an input/output port 12 which provides communication between the entire dynamically reconfigurable distributed integrated circuit processor and external devices.

Figure 3:
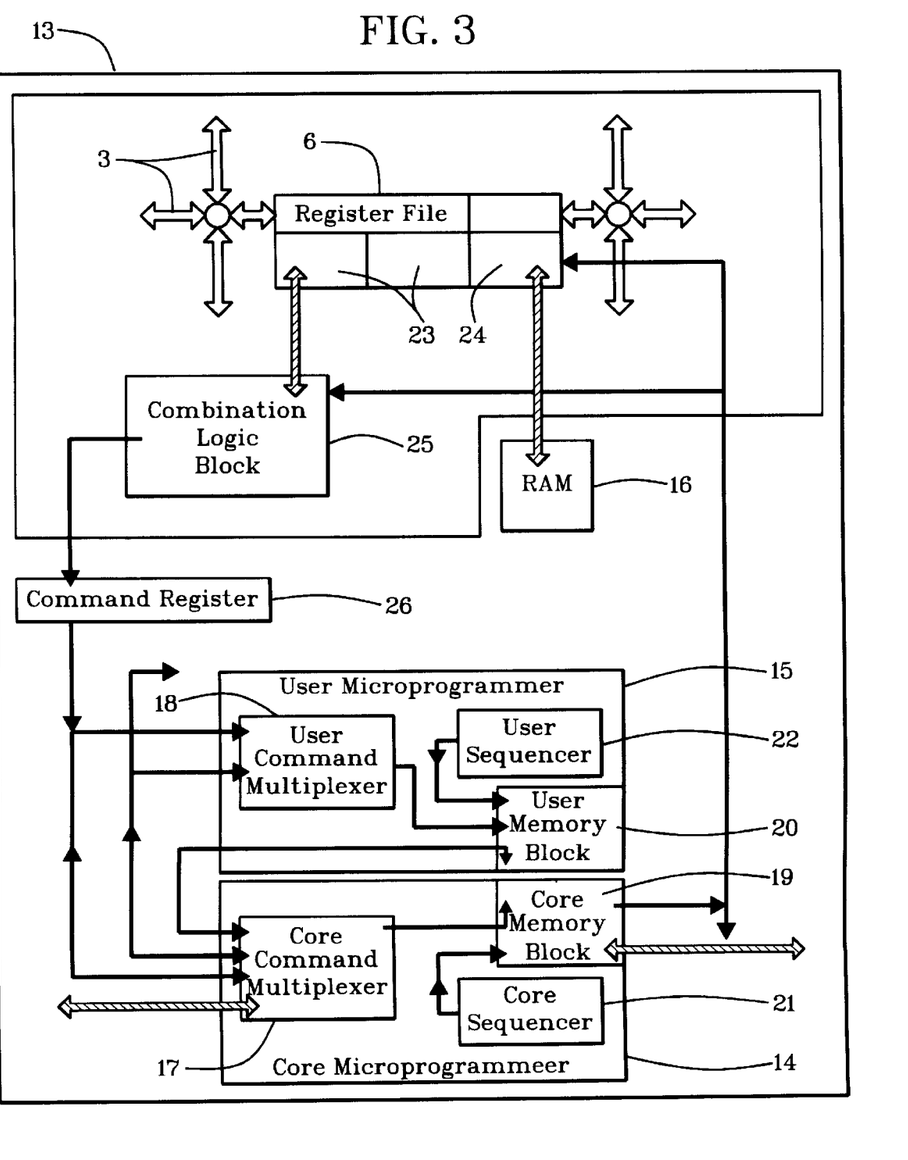
FIG. 3 is a plan view of the operative microcomputer module in operating relationship to a basic logic element.

Referring to FIGS. 3 and 1–2, each operative microcomputer module 1 includes a base logic element 13, a core microprogrammer 14, a user microprogrammer 15 and an operative memory 16. The core microprogrammer 14 and the user microprogrammer 15 comprise a micro-controller that can be constructed selectively for the operative microcomputer module 1. The FIG. 2 embodiment is preferable for maximum capabilities and applications.

For the FIG. 2 embodiment, the micro-controller has a two-way user microprogrammer 15 that is switchable into an input of the operative memory 16 which is series connected with a three-way core microprogrammer 14 and also series connected to the operative memory 16 which is switchable to one of its inputs. The core microprogrammer 14 and the user microprogrammer 15 have identical structures and have a core command multiplexer 17 and a user command multiplexer 18 which are serially connected to a core memory block 19 and a user memory block 20 which are micro-command controlled by a core sequencer 21 and a user sequencer 22, respectively.

The only differences between the core microprogrammer 14 and the user microprogrammer 15 are in relation to execution of the core multiplexer 17 and the user command multiplexer 18 due to differences of respective serial connections. The core command multiplexer 17 has two inputs, one of which is connected to the operative memory 16 and the other and the other to the control command output of the base logic element 13. The user command multiplexer 18 has three inputs, two of which are connected to operative memory 16 and the base logic element 13, of which a third is for an output of the user microprogrammer 15.

Architecture of the operative microcomputer modules 1 provides three levels of control of its operation. At a lower level, which is a core level, execution of tasks of testing working capacity of the operative microcomputer modules, as well as other service tasks for maintaining function of each individual operative microcomputer module 1, are assured by functions of the computer cluster 5. At an intermediate level, which is a user-control level, control is by the user. At a higher level of control, time conditions of algorithms of applied user problems are brought into agreement.

Such a hierarchy of level of control of operation of each of the operative microcomputer modules enables a "virtual processor" mode. An application programmer will make use of the matrix transparency of an operative microcomputer module 1 whereas a system design will make use of reconfiguration to achieve optimal virtual processor characteristics.

The base logic element 13 contains the register file 6 which has at least two n-bit active operand registers 23, one n-bit result register 24, a combination-logic block 25 that is multi-functionally controllable, a command register 26 and internal routes for transmission of data and commands. Each of the registers forming the final register file 6 has built-in means for routing incoming and outgoing streams of data and is connected by them to the local communication buses 3, the horizontal pathway bus 7 and the vertical pathway bus 8 depicted in FIG. 2. They are connected also to the combination-logic block 25.

The routing is achieved through the core command multiplexer 17 and the user command multiplexer 18 which are controlled by commands sent either from the core microprogrammer 14 of particular operative microcomputer modules 1 or by the pathway batch controller 9 of a corresponding computer cluster 5. Upon receipt of such command, each register, 23, 24, 6 and 27 is switched to one or more corresponding buses, 3, 7 or 8, or to a combination-logic block 25 for both register input and output. Reconfiguration of the routes of data transmission is provided both within each individual operative microcomputer module 1 and also by neighboring operative microcomputer modules 1, and more especially between operative microcomputer modules 1 which comprise particular computer clusters 5.

Reconfiguration is achieved by rerouting data to operative microcomputer modules 1 or computer clusters 5 having desired configuration and/or by reconfiguring particular operative microcomputer modules 1 and/or computer clusters 5 for desired computational objectives. Computer architecture and methods are provided for achieving computational objectives and for self-reconfiguration by the computer processor to achieve other computational objectives equally more rapid than has been possible previously.

The combination-logic block 25 has command-assigned computing or logic function of summation or comparison. Like control of multiplexers of the registers, assignment to combination-logic block 25 of required combination-logic function is performed by commands from the core microprogrammer 14 of a particular operative microcomputer module 1 or directly from the pathway batch controller 9 of a batch pathway of a corresponding computer cluster 5. When such a function is assigned and when the corresponding commands of routing data streams are assigned, the active operands 23 from the register file 6 are subjected to corresponding functional transformation in the combination-logic block 25. Subsequently, results of this transformation can be either (a) sent to local communication buses 3, (b) sent to global communications horizontal pathway buses 7 or vertical pathway buses 8 or (c) remain in the register file 6 for a subsequent cycle, depending on particular microcontrol command.

The command register 26 performs functions of transferring commands from a higher hierarchical level sent from the output of the corresponding pathway batch controller 9 to inputs of the core microprogrammer 14 and the user microprogrammer 15.

Owing to its architecture with command-reconfigurable external communications, each base logic element 13 is an elementary n-bit processor that is capable of combining with other base logic elements 13 in serial or parallel circuits of computers for a wide selection of computing models and calculation algorithms.

Figure 4:
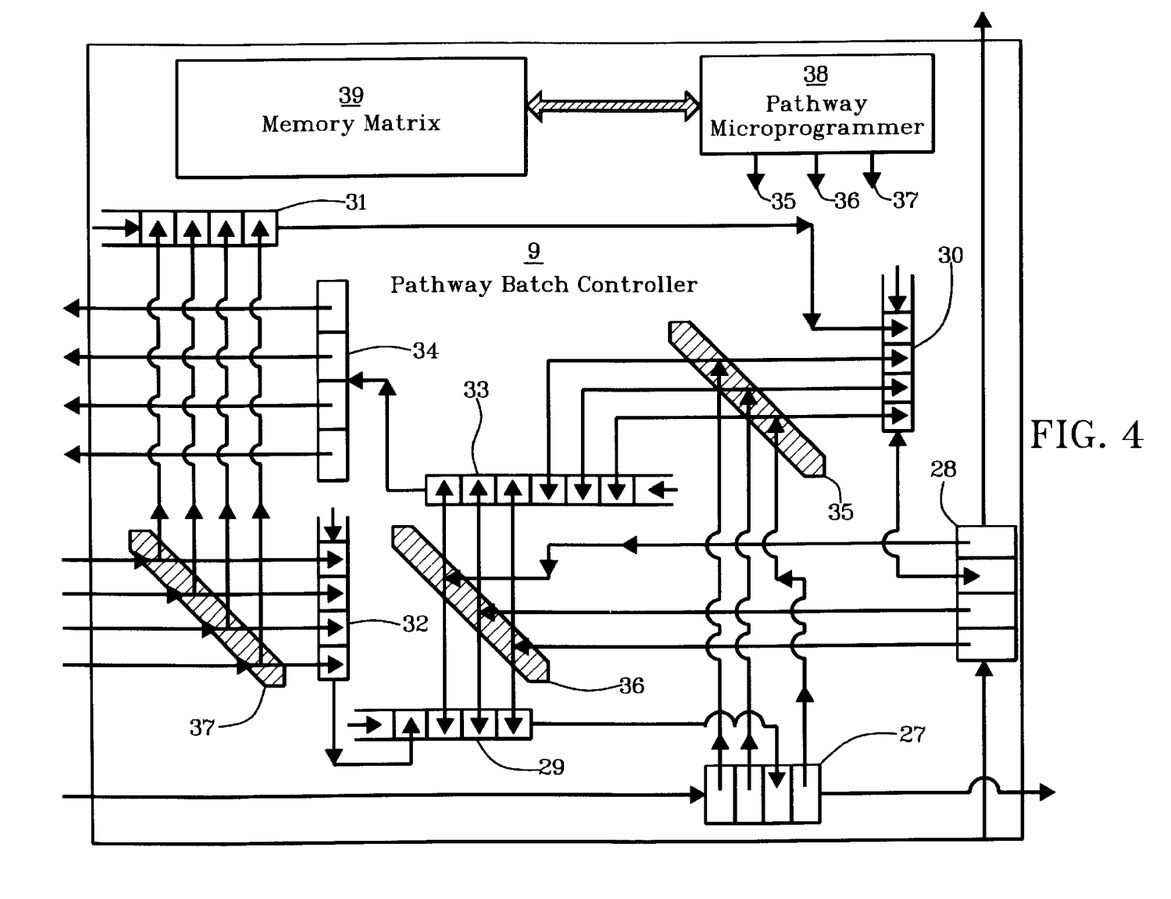
FIG. 4 is a structural diagram of internal communications in relationship to a pathway batch controller.

Referring to FIGS. 4 and 1–2, the pathway batch controller 9 has (a) a first transfer buffer register 27 and a second transfer buffer register 28 for transferring information batches along the horizontal pathway bus 7 and vertical pathway bus 8, (b) a first output stacking register 29 and a second output stacking register 30, (c) a first preliminary stacking register 31 and a second preliminary stacking register 32, (d) a module-data buffer 33 for transferring data to operative microcomputer modules 1 of a computer cluster 5 and (e) a cluster multiplexer 34. All of these registers have intercommunication through a first commutator 35, a second commutator 36 and a third commutator 37 which are controlled by a pathway microprogrammer 38 with a memory matrix 39.

All registers of pathway batch controllers 9 have first-in-first-out registration.

Figure 5:
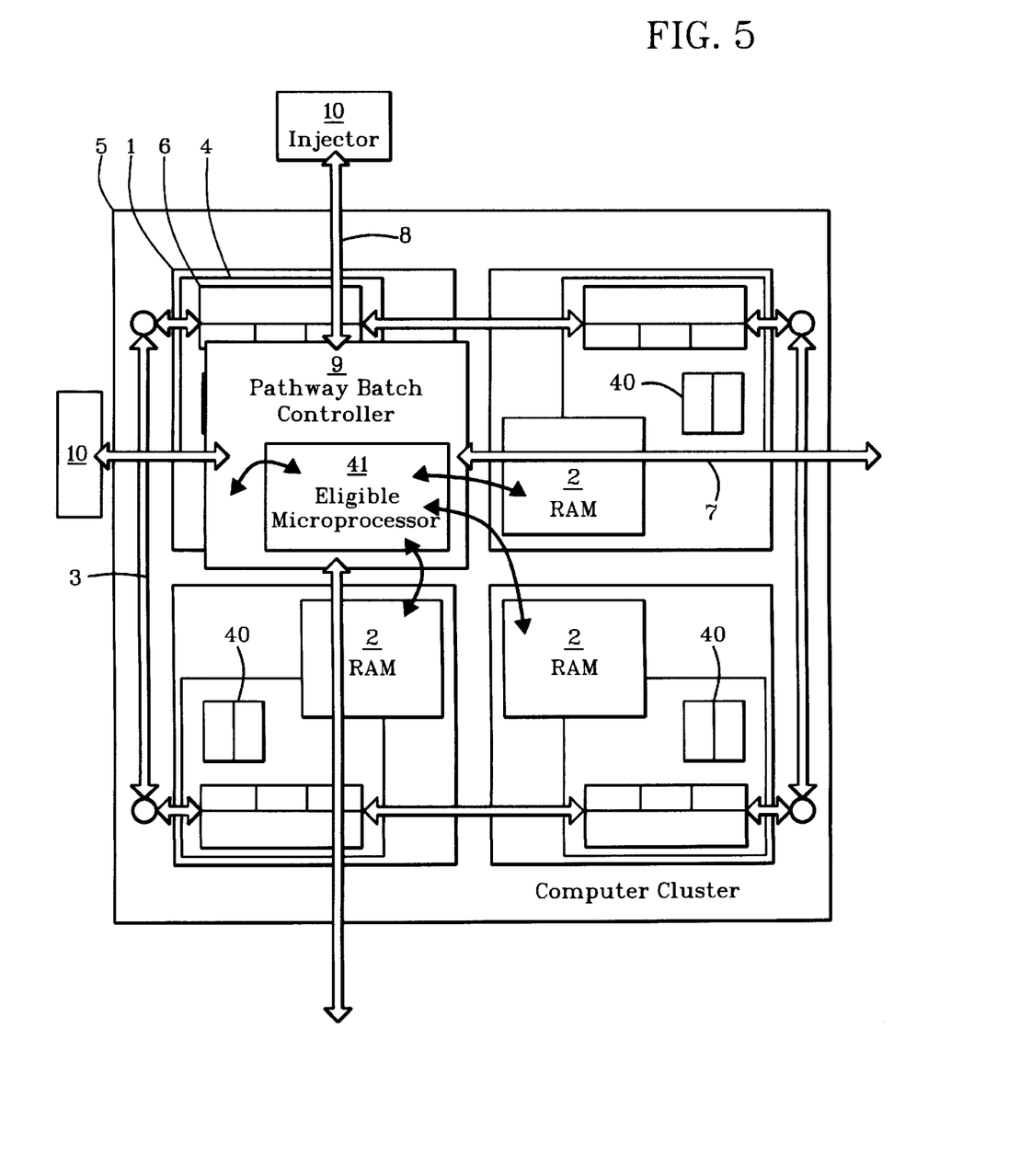
FIG. 5 is a flow diagram of data at structural levels of the integrated circuit.
Figure 6:
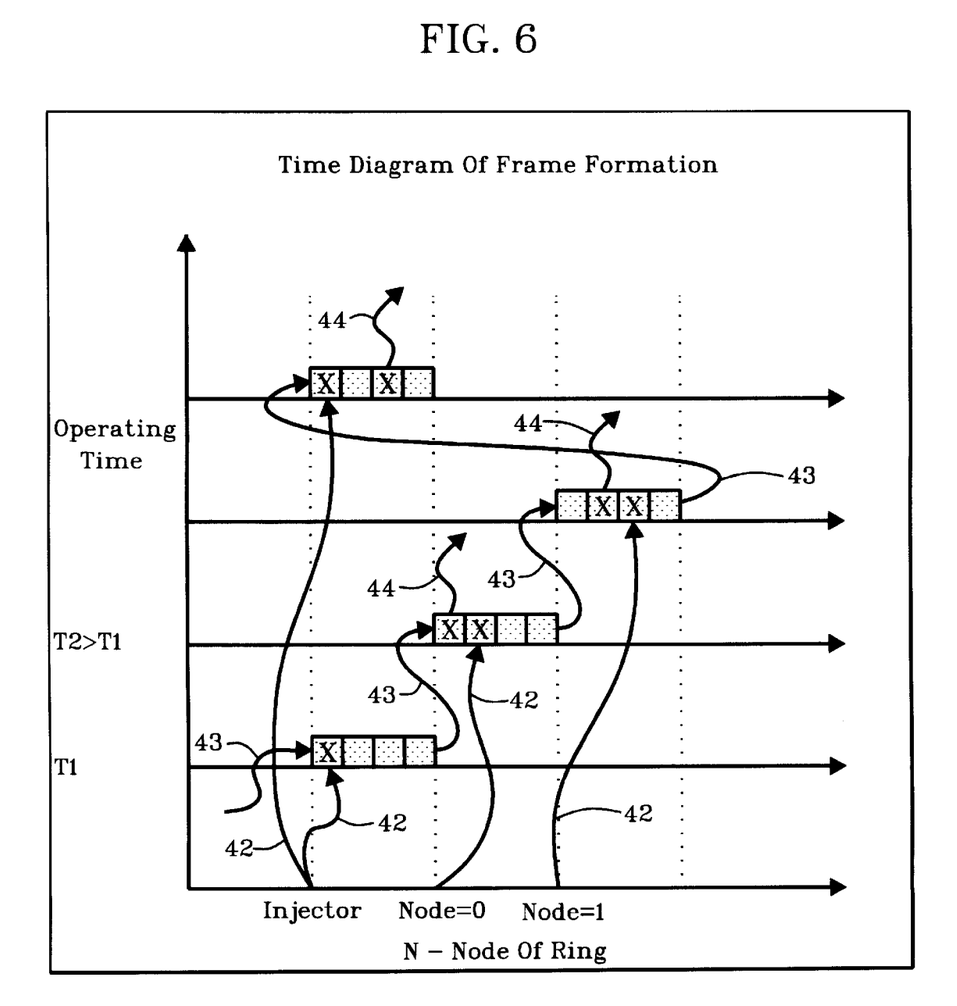
FIG. 6 is a time diagram of frame formation.
Figure 7:
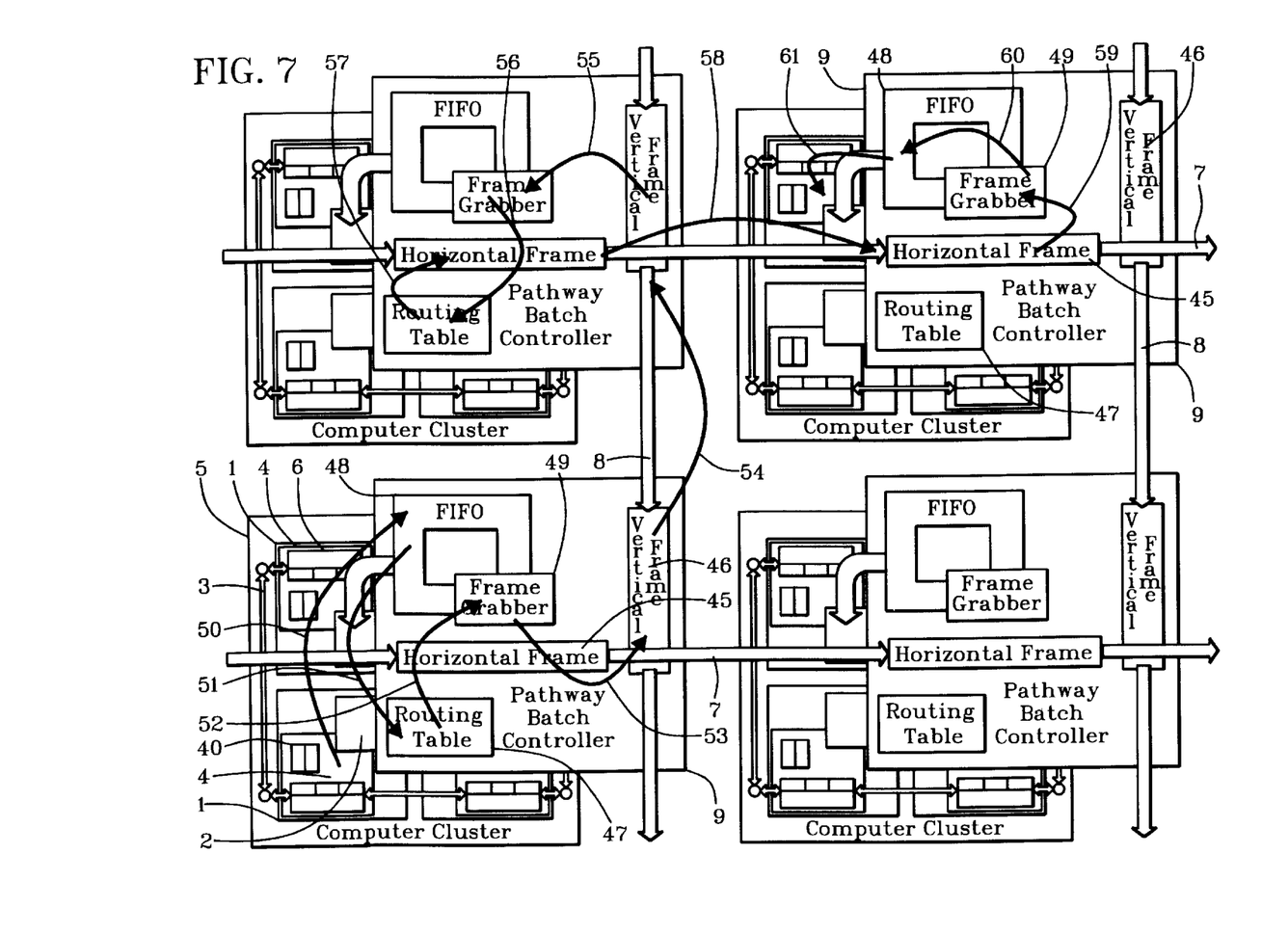
FIG. 7 is a flow diagram of frame transmission through batch pathways.

Referring to FIGS. 5–7 and to other FIGS. as indicated, control features of the dynamically reconfigurable distributed integrated circuit processor are spread out in a generally planar, chunky or spacial relationship that is congruent with distribution of operative microcomputer modules 1 described in relation to FIG. 1. With this structure, each individual component of an operative microcomputer module 1 is provided with individually microprogramming capability. Each operative microcomputer module 1 is microprogrammed such that, depending on problems being solved by the processor and on models and algorithms of computation adopted in solution of the problems, part of the connections of the data and command ports of a first operative microcomputer module 1 being utilized and corresponding data and command ports of at least one other operative microcomputer module 1 of those operative microcomputer modules 1 forming a computer cluster 5 with the first operative microcomputer module 1 and also with the pathway batch controller 9 of a corresponding computer cluster 5 (described in relation to FIG. 1) with a combination-logic block 25 (described in relation to FIG. 3) entering into its composition, are in a state of increased electrical conductance during a time of execution by the first operative microcomputer module 1 of a computing or logic operation programmed for the first operative microcomputer module 1.

Simultaneously, remaining parts of the connections of ports of the first operative microcomputer module 1 and other elements of the dynamically reconfigurable distributed integrated circuit processor are in a state of reduced electrical conductance.

Change or alteration of level of electrical conductance of the connections is accomplished by corresponding commutation of cluster multiplexers 34, core command multiplexers 17 and/or user command multiplexers 18 entering into makeup of registers which form the register file 6 of each operative microcomputer module 1.

Start-up of execution of each microprogram of operative microcomputer modules 1 is performed precisely as determined by conditions of problems being processed by the dynamically reconfigurable distributed integrated circuit processor and by at least one adopted computing model and algorithm. For example, a start-up can occur at reception of a data signal in at least one of a normally open state of reduced electrical conductance of data ports of the register file 6. At this time, an operative microcomputer module 1 can provide that pluralities of connections with reduced electrical conductance of the operative microcomputer module 1 to other elements of the dynamically reconfigurable distributed integrated circuit processor and addresses of those connections will be different for different sequential computing operations. This control provides capability for reconfiguration of the dynamically reconfigurable distributed integrated circuit processor in accordance with problems being solved by it in addition to its reconfiguration from commands of data streams separately.

As made possible by spread-out, chunky and/or planar distribution of the dynamically reconfigurable distributed integrated circuit processor, each structural element of an operative microcomputer module 1 contains within it microprogramming capability for interactions with incoming and outgoing information streams. A microprogram for such microprogramming capability can be resident or loaded from an external source, depending on conditions of application of the dynamically reconfigurable distributed integrated circuit processor and a problem being solved by it. When resident microprograms are used, their programming can be provided by known methods. When external programming is used, it can be loaded through the input-output injectors 10 described in relation to FIG. 2. Format of information being loaded externally is determined in accordance with characteristics of particular structural embodiments of the dynamically reconfigurable distributed integrated circuit processor, particularly the operative microcomputer module 1 and the pathway batch controller 9.

Generally, functioning of the dynamically reconfigurable distributed integrated circuit processor begins immediately when power is supplied to an operative microcomputer module 1 matrix. Then resident initialization microprograms of all operative microcomputer modules 1 and pathway batch controllers 9 (see FIG. 2) are started. Procedure for execution of these microprograms and the operative microcomputer module 1 provides initial checking of the equipment and setting up each operative microcomputer module 1 in a "slave" state. Procedure for execution of initialization and of the pathway batch controller 9 start-up provides filing of the memory matrix 39 (see FIG. 4) of each pathway batch controller 9 with data on working capacity of all operative microcomputer modules 1 of corresponding computer clusters 5 (see 1) for further control of transmission of incoming and outgoing data stream from an operative microcomputer module 1 of a computer cluster 5 in a master mode. Duration of procedure of initialization of the operative microcomputer module 1 being in excess of duration of procedure for initialization of the pathway batch controller 9, start-up of an initialization microprogram of the pathway batch controller 9 can be delayed relative to beginning of initialization of the process of operative microcomputer module 1.

Upon completion of execution by all operative microcomputer modules 1 and pathway batch controllers 9 of the resident initialization microprograms, the dynamically reconfigurable distributed integrated circuit processor is ready for operation with data streams.

The data streams are introduced through the injectors 10, the horizontal pathway buses 7 and the vertical pathway buses 8 described in relation to FIG. 2. Depending on type of programming used, particularly whether it is resident or external, the data streams can be grouped to undergo processing or an application loaded from the outside. In any case, each of the data streams has a frame structure with frame fragments that are correlated with particular levels of structural organization of the operative microcomputer module 1.

FIG. 5 shows an example of a correlation of format of presentation with the levels of structural organization of the operative microcomputer module 1 in which each operative microcomputer module 1 of a computer cluster 5 is indicated as consisting of an operative local memory 2, an operator element 4 and a local decoder 40. Data presentation can correspond to each indicated structural level of the operative microcomputer module 1.

Forms of presentation of command data at different structural levels of the matrix include a Form 0, a Form 1, a Form 2 and a Form 3. Form 0 includes an address 1, an address 2, an operation code, an operation address and a supplemental address. Form 1 includes an address 2, an operation code, an operation address and a supplemental address. Form 2 includes an operation code, an operation address and a supplemental address. Form 3 includes an operation code and an operation address.

The address 1 is an external address of a computer cluster 5 on a batch pathway. The address 2 is an address of an eligible microprocessor 41 in a computer cluster 5. The operation code is an operation code for a given command. The supplemental address is a possible supplemental global address.

Address 1 of Form 0 is directed to the pathway batch controller 9 through a horizontal pathway bus 7. Address 2 of Form 1 is directed to the eligible microprocessor 41. Operation code of Form 2 is directed to local decoders 40. In a plurality of operative microcomputer modules 1, operation code of Form 3 is directed to a particular single local decoder 40.

Data stream introduced is transmitted along a closed cycle comprising a plurality of nodes consisting of a pathway batch controller 9 and an injector 10 through which data programmed is output. Upon transmission of data through this closed cycle at each of the plurality of nodes, information is added to or removed from corresponding frame fragments. Addition of information is through an appropriate address, even for empty fragments in a frame corresponding to a particular node. Information is removed from a frame through the pathway batch controller 9 if a particular address coincides with a current address of a node or is an address of a node of an orthogonal data transmission cycle.

FIG. 6 shows an example of a time diagram of formation of frame in the process of transmission of data through a cycle. A first vector 42 denotes addition of information to a corresponding frame fragment. A second vector 43 denotes transfer of a frame from a previous node to a subsequent node and a third vector 44 denotes removal of information from a frame.

FIG. 7 depicts an example of a sequence of frame transmission of data through the horizontal pathway buses 7 containing horizontal frames 45 and the vertical pathway buses 8 containing vertical frames 46. The pathway batch controller 9 has a routing table 47, a FIFO 48 (first-in, first-out) and a frame grabber 49. A FIFO is a type of buffer arrangement wherein the first sample stored in the buffer is the first one to be retrieved.

Link vectors 50 through 61 indicate sequential links of a chain of data transmission. Generally, addition of information to and removal of information from a frame is accomplished through pathway batch controllers 9, described in relation to FIGS. 2 and 4, in the following manner. A first link vector 50 is from an operator element 4 to a FIFO 48. A second link vector 51 is from a FIFO 48 to routing table 47. A third link vector 52 is from a routing table 47 to frame grabber 49. A fourth link vector 53 is from a frame grabber 49 to a vertical frame 46. A fifth link vector 54 is from a vertical frame 46 to vertical pathway bus 8. A sixth link vector 55 is from a vertical frame 46 to a frame grabber 49. A seventh link vector 56 is from a frame grabber 49 to a routing table 47. An eighth link vector 57 is from a routing table 47 to a horizontal frame 45. A ninth link vector 58 is from a horizontal frame 45 to a horizontal pathway bus 7. A tenth link vector 59 is from a horizontal frame 45 to a frame grabber 49. An eleventh link vector 60 is from a frame grabber 49 to a FIFO 48. A twelfth link vector 61 is from a FIFO 48 to an operator element 4.

An information-containing frame enters into one of either first transfer buffer register 27 or second transfer buffer register 28, described in relation to FIG. 4, of a pathway batch controller 9. Subsequently, the information is counted from cells of the register 27 or 28 into which the frame enters and which are not actual cells of an employed node. FIG. 4 shows counting of information by vectors. If an address 1 of a frame introduced into buffer register 27 or 28 coincides with an address of a particular pathway batch controller 9, then the information counted from the corresponding cells passes through the first commutator 35 and the second commutator 36 to the module data buffer 33 and further through the cluster multiplexer 34 in accordance with an address 2, described in relation to FIG. 5, to a specific operative microcomputer module 1. If the address 1 of the frame introduced into a buffer register corresponds to the pathway batch controller 9 which is on an orthogonal batch pathway, then the information is sent through the first commutator 35 and the second commutator 36 to one of a corresponding first output stacking register 29 or second output stacking register 30 from which the information is loaded subsequently into those cells of the buffer registers 27 or 28 which correspond to frame fragments of a particular node.

Through the third commutator 37 and the preliminary stacking registers 31 and 32, information is sent also to the output stacking registers 29 and 30 from all operative microcomputer modules 1 of a computer cluster 5 for inclusion in a corresponding frame fragment and subsequent transmission through the batch pathways of the horizontal pathway buses 7 and vertical pathway buses 8 into operative microcomputer modules 1 of other computer clusters 5 or through the injector 10 to an external device of the dynamically reconfigurable distributed integrated circuit processor.

A new and useful dynamically reconfigurable distributed integrated circuit processor and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A dynamically reconfigurable distributed integrated circuit processor comprising:

at least one two-layer integrated circuit matrix with a first layer and a second layer;

the first layer having a plurality of operative microcomputer modules of computers distributed in one or more computational clusters and linked together by a network of local communications connecting buses;

the second layer being a network of global communications connecting buses that are coherent with the first layer through at least one pathway batch controller proximate at least one network node of the global communications connecting buses;

each of the operative microcomputer modules having at least three n-bit active operand inputs, one instruction input, two n-bit active operand outputs, one n-bit result output, and one instruction operand output;

each of the operative microcomputer modules having basic logic elements;

the basic logic elements each having at least two basic n-bit active operand registers, one basic n-bit result register with input and output data-stream routing devices built into the register, a multifunctional controllable combination logic unit with an instruction-assigned operating function, an instruction register, and a set of internal-data and instruction transfer buses;

the packet decoder having one control microinstruction address input and a plurality of outputs equal to a plurality of operative microcomputer modules in a computational cluster;

the network of local communications connecting buses having a first set of buses linking active operand inputs and outputs and the result operand outputs of each of the operative microcomputer modules with the active operand inputs and outputs and the result operand outputs of the operative microcomputer modules of each computational cluster and corresponding global communications buses; and a second set of buses linking the control microinstruction inputs and outputs of each of the operative microcomputer modules with the control microinstruction inputs and outputs of the operative microcomputer modules of each computational cluster and corresponding global communications buses.

2. A dynamically reconfigurable distributed integrated circuit processor as described in claim 1 wherein:

computational clusters of operative microcomputer modules have select pluralities of operative microcomputer modules.

3. A dynamically reconfigurable distributed integrated circuit processor as described in claim 1 wherein:

outputs of packet decoders are in communication with control instruction inputs of operative microcomputer modules of computational clusters.

4. A dynamically reconfigurable distributed integrated circuit processor as described in claim 1 wherein:

a peripheral interface of the global communications connecting bus has a serial two-input user microprogrammer and a three-input core microprogrammer;

the user microprogrammer has a first input connected to output of a corresponding packet decoder and a second input linked to user instruction memory;

the three-input core microprogrammer has a first input linked with output of the user microprogrammer, a second input linked with output of a corresponding packet decoder, and a third input connected to the core instruction memory; and output of the core microprogrammer is communicated to control instruction input of the basic logic elements.

5. A dynamically reconfigurable distributed integrated circuit processor as described in claim 4 wherein:

the peripheral interface has a serially connected instruction multiplexer with inputs that are inputs of the user microprogrammer and has a microinstruction-operative memory connected to a sequencer having output that is output of the user microprogrammer.

6. A dynamically reconfigurable distributed integrated circuit processor as described in claim 4 wherein:

the core microprogrammer has a serially connected instruction multiplexer with inputs that are inputs of the core microprogrammer and has a microinstruction-operative memory linked with a sequencer having an output that is an output of the core microprogrammer.

7. A method comprising the following steps for using a dynamically reconfigurable distributed integrated circuit processor:

providing a dynamically reconfigurable distributed integrated circuit processor having at least one two-layer integrated circuit matrix with a first layer and a second layer, the first layer having a plurality of operative microcomputer modules of computers distributed in one or more computational clusters and linked together by a network of local communications connecting buses, the second layer being a network of global communications connecting buses that are coherent with the first layer through at least one packet decoder proximate at least one network node of the global communications connecting buses, and an injector for microcontrol peripheral communication with the global communications connecting buses;

microprogramming the operative microcomputer modules such that select connections of data and instruction ports of at least a first operative microcomputer module has data and instruction ports that correspond selectively with data and instruction ports of at least a second operative microcomputer module in at least a first computational cluster of operative microcomputer modules;

providing a select state of elevated electrical conductivity of the global communications buses and packet decoders of at least the first computational cluster of operative microcomputer modules during execution of selectively computational and logical operation by at least one select operative microcomputer module for at least one algorithm employed for the computational and logical operation by the at least one select operative microcomputer module;

providing a select state of low electrical conductivity of other connections of the select operative microcomputer module with other processor elements during the execution of the selectively computational and logical operation by the at least one operative microcomputer module; and starting execution of microprogramming of operative microcomputer modules selectively for targeted application algorithms.

8. A method as described in claim 7 wherein:

starting execution of microprogramming of operative microcomputer modules coincides with a time of entry of a data signal in at least one data port of at least one operative microcomputer module.

9. A method as described in claim 7 and further providing a plurality of electrical connections with select states of elevated electrical conductivity to the global communications buses that differs selectively from at least one subsequent plurality of computational and logical operations by a select operative microcomputer module.

10. A method as described in claim 7 and further providing electrical connections with select states of elevated electrical conductivity in execution of at least one assigned computation and logical operation selectively by commutation with a multiplexer.

11. A dynamically reconfigurable distributed integrated circuit processor comprising:

at least one two-layer integrated circuit with a first layer and a second layer;

the first layer having a plurality of operative microcomputer modules distributed in one or more computer clusters of operative microcomputer modules and linked together by a network of local communications connecting buses having generally orthogonal switchable intersections;

the second layer being a network of global communication buses having generally orthogonal intersections that are coherent with the first layer through at least one pathway batch controller proximate at least one intersection of the global communication buses;

wherein the first layer and the second layer have a generally planar distribution of the plurality of operative microcomputer modules, the one or more computational clusters of operative microcomputer modules, the network of local communications connecting buses with which the plurality of operative microcomputer modules are linked together and the network of global communication buses that are coherent with the first layer;

wherein the operative microcomputer modules are generally rectangular with proximately adjoining corners in matrices of four or more that comprise computer clusters;

wherein the at least one pathway batch controller is a plurality of pathway batch controllers proximate a plurality of intersections of the global communication buses that coincide with geometric centers of computer clusters;

wherein each of the operative microcomputer modules have at least three n-bit active operand inputs, one instruction input, two n-bit active operand outputs, one n-bit result output, and one instruction operand output; and the global communications connecting buses having peripheral interface through at least one injector.

12. A dynamically reconfigurable distributed integrated circuit processor as described in claim 11 wherein:

each of the operative microcomputer modules have basic logic elements; and the basic logic elements each have at least two basic n-bit active operand registers, one basic n-bit result register with input and output data-stream routers built into the register, a multifunctional controllable combination logic unit with an instruction-assigned operating function, an instruction register, and a set of internal-data and instruction transfer buses.

13. A dynamically reconfigurable distributed integrated circuit processor as described in claim 12 wherein:

the network of local communications connecting buses have a first set of buses linking active operand inputs and outputs and the result operand outputs of each of the operative microcomputer modules with the active operand inputs and outputs and the result operand outputs of the operative microcomputer modules of each computational cluster and corresponding global communications buses.

14. A dynamically reconfigurable distributed integrated circuit processor as described in claim 13 and further comprising:

a second set of buses linking the control microinstruction inputs and outputs of each of the operative microcomputer modules with the control microinstruction inputs and outputs of the operative microcomputer modules of each computational cluster and corresponding global communications buses.

* * * * *